(12) United States Patent
Yun et al.

(10) Patent No.: US 8,582,709 B2
(45) Date of Patent: Nov. 12, 2013

(54) BANDWIDTH SYNCHRONIZATION CIRCUIT AND BANDWIDTH SYNCHRONIZATION METHOD

(75) Inventors: Jaegeun Yun, Hwaseong-si (KR); Hyunuk Jung, Hwaseong-si (KR); Junhyung Um, Seoul (KR); Sunghoon Shim, Seongnam-si (KR); Sung-Min Hong, Hwaseong-si (KR); Bub-chul Jeong, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 412 days.

(21) Appl. No.: 12/896,213

(22) Filed: Oct. 1, 2010

(65) Prior Publication Data
US 2011/0122982 A1    May 26, 2011

(30) Foreign Application Priority Data
Nov. 26, 2009  (KR) .................. 10-2009-0115414

(51) Int. Cl.
*H04L 7/04*  (2006.01)
(52) U.S. Cl.
USPC ............. 375/362; 73/861.16; 369/60.01; 716/138

(58) Field of Classification Search
None
See application file for complete search history.

(56) References Cited

U.S. PATENT DOCUMENTS
2003/0007394 A1 *  1/2003  Phi et al. ............... 365/200

FOREIGN PATENT DOCUMENTS
| | | |
|---|---|---|
| JP | 09-016511 | 1/1997 |
| JP | 2006-164119 | 6/2006 |
| KR | 10-2006-0103683 | 10/2006 |

OTHER PUBLICATIONS
PrimeCell High-Performance Matrix (PL301) Revision: r1p2, Technical Reference Manual, 2006.

* cited by examiner

*Primary Examiner* — Adolf Dsouza
(74) *Attorney, Agent, or Firm* — Harness, Dickey & Pierce, P.L.C.

(57) ABSTRACT

Example embodiments are directed to a bandwidth synchronization circuit and a bandwidth synchronization method. The bandwidth synchronization circuit includes an upsizer and a syncdown unit. The upsizer includes a sync packer and a sync unpacker operating according to a first clock. The syncdown unit is connected to the upsizer and performs a syncdown operation on data of the upsizer in response to a second clock of a frequency lower than a frequency of the first clock.

29 Claims, 12 Drawing Sheets

| ARM1176PB_L2WAlloc_AXI.out ||||
|---|---|---|---|
| Cycle from AR(n-1) to AR(n) (Wrap burst 4 read) | Traffic Count | Ratio(%) | Acc Ratio(%) |
| 0 | 51948 | 2.9 | 2.9 |
| 1 | 49988 | 2.8 | 5.7 |
| 2 | 20729 | 1.2 | 6.9 |
| 3 | 21076 | 1.2 | 8.1 |
| 4 | 17491 | 1.0 | 9.1 |
| 5 | 9700 | 0.5 | 9.6 |
| 6 | 5917 | 0.3 | 10.0 |
| 7 | 7847 | 0.4 | 10.4 |
| 8 | 8582 | 0.5 | 10.9 |
| 9 | 4263 | 0.2 | 11.1 |
| ≧10 | 1578823 | 88.9 | 100 |
| Total | 1776364 | | |
| AR Total | 1898231 | 106.9 | |
| AW Total | 845082 | 47.6 | |
| W Total | 2958550 | 166.6 | |

Fig. 11

| L2AWCACHEattr_AXI.out | | | |
|---|---|---|---|
| Cycle from AR(n-1) to AR(n) (Wrap burst 4 read) | Traffic Count | Ratio(%) | Acc Ratio(%) |
| 0 | 14409 | 1.1 | 1.1 |
| 1 | 38617 | 2.9 | 3.9 |
| 2 | 17156 | 1.3 | 5.2 |
| 3 | 17099 | 1.3 | 6.5 |
| 4 | 14621 | 1.1 | 7.5 |
| 5 | 8697 | 0.6 | 8.2 |
| 6 | 4857 | 0.4 | 8.5 |
| 7 | 6393 | 0.5 | 9.0 |
| 8 | 5642 | 0.4 | 9.4 |
| 9 | 3886 | 0.3 | 9.7 |
| ≧10 | 1219169 | 90.3 | 100 |
| Total | 1350546 | | |
| AR Total | 1483409 | 109.8 | |
| AW Total | 5245290 | 388.4 | |
| W Total | 6535315 | 483.9 | |

Fig. 12

BANDWIDTH SYNCHRONIZATION CIRCUIT AND BANDWIDTH SYNCHRONIZATION METHOD

CROSS-REFERENCE TO RELATED APPLICATIONS

This U.S. non-provisional patent application claims priority under 35 U.S.C. §119 to Korean Patent Application No. 10-2009-0115414, filed on Nov. 26, 2009, the entire contents of which are hereby incorporated by reference.

BACKGROUND

Example embodiments relate to a data processing system, and more particularly, to a bandwidth synchronization system in mobile systems, for example, smart phones or navigation devices or the like.

In mobile systems such as smart phones, personal navigation devices, portable Internet devices, portable broadcasting devices, and/or multimedia devices, high performance mobile application processors operating at a high frequency are used on a System on Chip (hereinafter, referred to as "SoC") to support various applications.

Since the mobile application processors perform arithmetic operation, logic operations and/or program command execution, the mobile application processors are elements that are resource intensive (for example, memory intensive) and may affect performance of a mobile SoC. The mobile application processors may include an on-chip secondary cache, referred to as an L2 (level 2) cache, to enable integration of various functions such as wireless communication, personal navigation, camera, portable gaming, portable music/video player, unified mobile TV, and/or Personal Digital Assistant (PDA). The L2 cache may increase the performance of the mobile system during instances of high memory utilization by the processor.

For efficient design of the SoC, selection of a bus system for mutual communication between a plurality of Intellectual Properties (IPs) (for example, memories, controllers, drivers, or the like) integrated on one chip is of high importance. A typical example of a bus system is an AMBA 3.0 Advanced eXtensible Interface (AXI) bus system based on AMBA protocol from Advanced RISC Machine (ARM) Inc.

Because of limitations in, for example, development time and manpower, peripheral functional blocks such as Direct Memory Access Controller (DMAC), Universal Serial Bus (USB), Peripheral Component Interconnection (PCI), Static Memory Controller (SMC), and/or Smart Card Interface (SCI) that are parts of SoC may be purchased as separate IPs. These purchased peripheral functional block IPs may then be integrated on a chip along with a Central Processing Unit (CPU) and other data processing functional blocks to constitute the SoC.

With an increase in demand for high performance mobile application processors, the operating frequency of a CPU and a cache controller in a SoC is in the order of several gigahertz (GHz). On the contrary, because the frequency of the bus may not be increased to a level of several GHz, a data bus width wider than that of the CPU is used to satisfy bandwidth requirements. For example, when the data bus width of a CPU having an operating frequency of about 1 GHz is 64-bit, the operating frequency of the bus system may be designed to have an operating frequency of about 200 MHz and a data bus width of about 128-bit.

A syncdown logic and 64-bit to 128-bit upsizer circuit may be connected to a cache controller and may synchronize about 1 GHz to about 200 MHz between a CPU having a 64-bit data bus width and a 1 GHz operating frequency and a bus system having a 128-bit data bus width and a 200 MHz operating frequency.

In this case, a part of a synchronized syncdown point operating at 64-bit 200 MHz has a bandwidth of about 1.6 GBps, which acts as a bandwidth bottleneck compared to a CPU bandwidth of about 8 GBps or an upsizer bandwidth of about 3.2 GBps. Accordingly, performance of a high frequency CPU as well as a high data width bus system may be reduced.

Therefore, a bandwidth synchronization technology is required to improve the system performance by solving the bandwidth bottleneck in a mobile system.

SUMMARY

According to example embodiments of the inventive concepts, a bandwidth synchronization circuit includes an upsizer including at least one sync packer and at least one sync unpacker, the at least one sync packer and the at least one sync unpacker operating based on a first clock; and a syncdown unit connected to the upsizer and configured to perform a syncdown operation on data of the upsizer in response to a second clock having a frequency lower than a frequency of the processor clock.

According to example embodiments of the inventive concepts, the first clock is a processor clock having a frequency of about 1 GHz and the second clock is a bus clock having a frequency of about 200 MHz.

According to example embodiments of the inventive concepts, the at least one sync packer performs a sync packing on a write address channel, a write data channel, and a write response channel, and the at least one sync unpacker performs a sync unpacking on a read address channel and a read data channel.

According to example embodiments of the inventive concepts, the at least one sync packer includes: a first sync memory and a second sync memory, the first and second sync memories configured to receive at least one of the write address channel, the write data channel, and the write response channel, and the at least one sync unpacker includes: a third sync memory and a fourth sync memory, the third and fourth sync memories configured to receive at least one of the read address channel and the read data channel.

According to example embodiments of the inventive concepts, the first sync memory stores an address of the write address channel in response to a control from a sync packing controller, and upsizes the stored address to output the upsized address to the syncdown unit.

According to example embodiments of the inventive concepts, the second sync memory stores data of the write data channel in response to a control from a sync packing controller, and upsizes the stored data to output the upsized data to the syncdown unit.

According to example embodiments of the inventive concepts, the third sync memory stores an address of the read address channel in response to a control from a sync unpacking controller, and upsizes the stored address to output the upsized address to the syncdown unit through a selector.

According to example embodiments of the inventive concepts, the fourth sync memory stores data of the read data channel in response to a control of a sync unpacking controller, and outputs the stored data to a slave interface via a selector.

According to example embodiments of the inventive concepts, at least one of the first, second, third and fourth sync memory is a First-In First-Out (FIFO) memory.

According to example embodiments of the inventive concepts, the syncdown unit comprises a sync memory configured to store data; a match value configured to store at least one match value; a match configured to determine whether the data stored in the sync memory matches the at least one match value; and a first and a second flip-flop configured to latch data in response to an activation signal generated from the match.

According to example embodiments of the inventive concepts, the upsizer includes a first sync packer and a second sync packer respectively operating in response to the first clock and the second clock; and a first sync unpacker and a second sync unpacker respectively operating in response to the first and second clocks, the first clock and the second clock having different frequencies.

According to example embodiments of the inventive concepts, the frequency of the first clock is about 400 MHz and the frequency of the second clock is about 200 MHz.

According to example embodiments of the inventive concepts, the first clock is supplied from a processor side of the circuit, and the second clock is supplied from a bus side of the circuit.

According to example embodiments of the inventive concepts, the first and second sync packers share a first sync memory and a second sync memory, the first and second sync memories configured to receive at least one of a write address channel, a write data channel, and a write response channel; and the first and second sync unpacker share a third sync memory and a fourth sync memory, the third and fourth sync memories configured to receive at least one of a read address channel and a read data channel.

According to example embodiments of the inventive concepts, the first sync memory stores an address of the write address channel in response to a control from a sync packing controller.

According to example embodiments of the inventive concepts, the second sync memory stores data of the write data channel in response to a control from a sync packing controller.

According to example embodiments of the inventive concepts, the third sync memory stores an address of the read address channel in response to a control from a sync unpacking controller.

According to example embodiments of the inventive concepts, the fourth sync memory stores an address of the read data channel in response to a control from a sync unpacking controller.

According to example embodiments of the inventive concepts, the at least one sync unpacker outputs data having a first data width in response to a desired request and the second clock, the first data width being greater than a second data width; and the bandwidth synchronization circuit further includes a request selection supplying unit configured to block at least a portion of the data, the blocked portion having a width of the second data width, in response to a general request, and the request selection supplying unit configured to supply the data having the first data width in response to the desired request and the first clock, a frequency of the first clock being greater than a frequency of the second clock.

According to example embodiments of the inventive concepts, the request selection supplying unit is at a central processing unit (CPU) side of the circuit.

According to example embodiments of the inventive concepts, the desired request is a wrap 4 burst read request.

According to example embodiments of the inventive concepts, the first data width is 128-bits and the second data width is 64-bits.

According to example embodiments of the inventive concepts, the data output by the sync unpacker is a read data having a width greater than the second data width.

According to example embodiments of the inventive concepts, a data processing system includes a processor connected to a cache controller; the bandwidth synchronization circuit according to example embodiments disclosed above connected between the processor and an interface bus; and a plurality of peripheral functional blocks connected to the interface bus.

According to example embodiments of the inventive concepts, the peripheral functional block include at least two of Direct Memory Access Controller (DMAC), Universal Serial Bus (USB), Peripheral Component Interconnection (PCI), Static Memory Controller (SMC), and Smart Card Interface (SCI).

According to example embodiments of the inventive concepts, the interface bus is an Advanced eXtensible Interface (AXI) bus.

According to example embodiments of the inventive concepts, in a 64-bit wrap 4 burst read, the upsizer supplies one 128-bit read data at every cycle of the second clock having a frequency of about 200 MHz.

According to example embodiments of the inventive concepts, a bandwidth synchronization method includes driving a processor at a first clock frequency and an upsizer connected to an interface bus with a second clock frequency; outputting, to the upsizer, a read data having with a first data width in synchronization with the second clock frequency with respect to a first read command, and outputting a read data with a second data width in synchronization with the second clock frequency with respect to a second read command; blocking, in the upsizer, the read data when the read data with the first data width is input; and supplying the read data in synchronization with the first clock frequency for two cycles of the first clock when the read data with the second data width is input.

According to example embodiments of the inventive concepts, the first data bit width is 64-bit, the second data bit width is 128-bit.

According to example embodiments of the inventive concepts, the first clock frequency is about 1 GHz and the second clock frequency is about 200 MHz.

BRIEF DESCRIPTION OF THE DRAWINGS

The above and other features and advantages will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION OF THE EMBODIMENTS

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These ter ins are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular fowls "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 1:
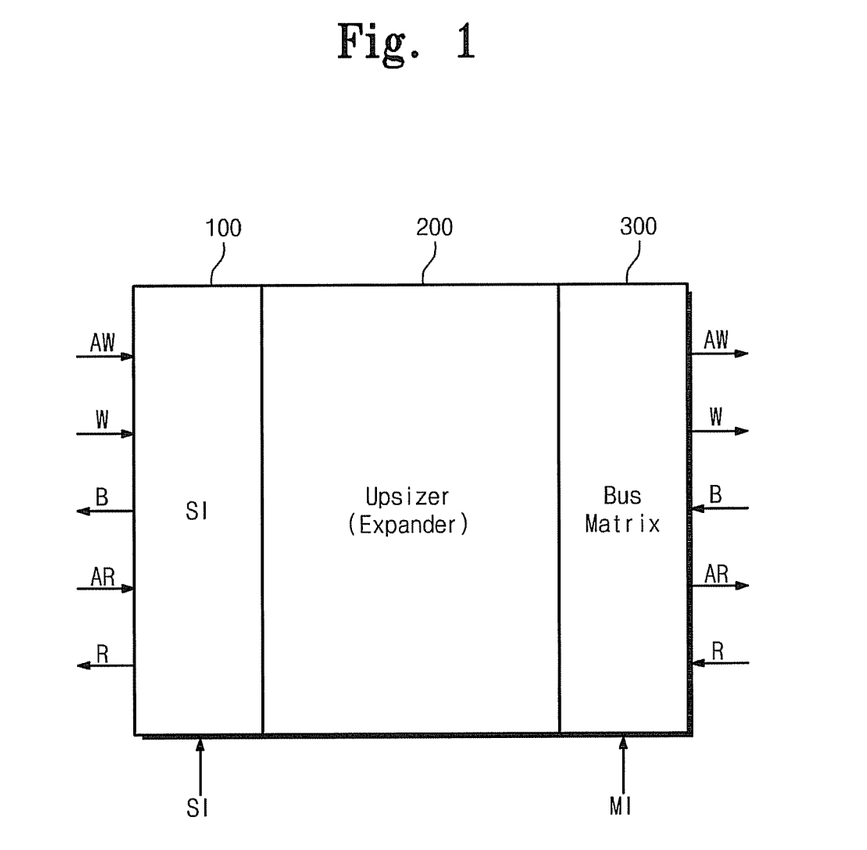
FIG. 1 is a block diagram illustrating a bandwidth synchronization circuit according to example embodiments of the inventive concepts.

FIG. 1 is a block diagram illustrating a bandwidth synchronization circuit according to example embodiments of the inventive concepts.

Referring to FIG. 1, an upsizer 200 may be installed between a slave interface 100 and a bus matrix 300. The upsizer 200 may perform a function of a data expander that may expand, for example, 64-bit data to 128-bit data, to perform bandwidth synchronization. In FIG. 1, the slave interface 100 may be connected to a Central Processing Unit (CPU) having a 64-bit wide data bus and around 1 GHz operating frequency, and the bus matrix 300 may be a bus system having a 128-bit wide data bus and around 200 MHz operating frequency. The bus matrix 300 may have a multi layer bus matrix structure.

In FIG. 1, AW represents write address channel signals, W represents write data channel signals, B represents write response channel signals, AR represents read address channel signals, and R represents read data channel signals. SI and MI represent a slave interface and a master interface, respectively.

Figure 2:
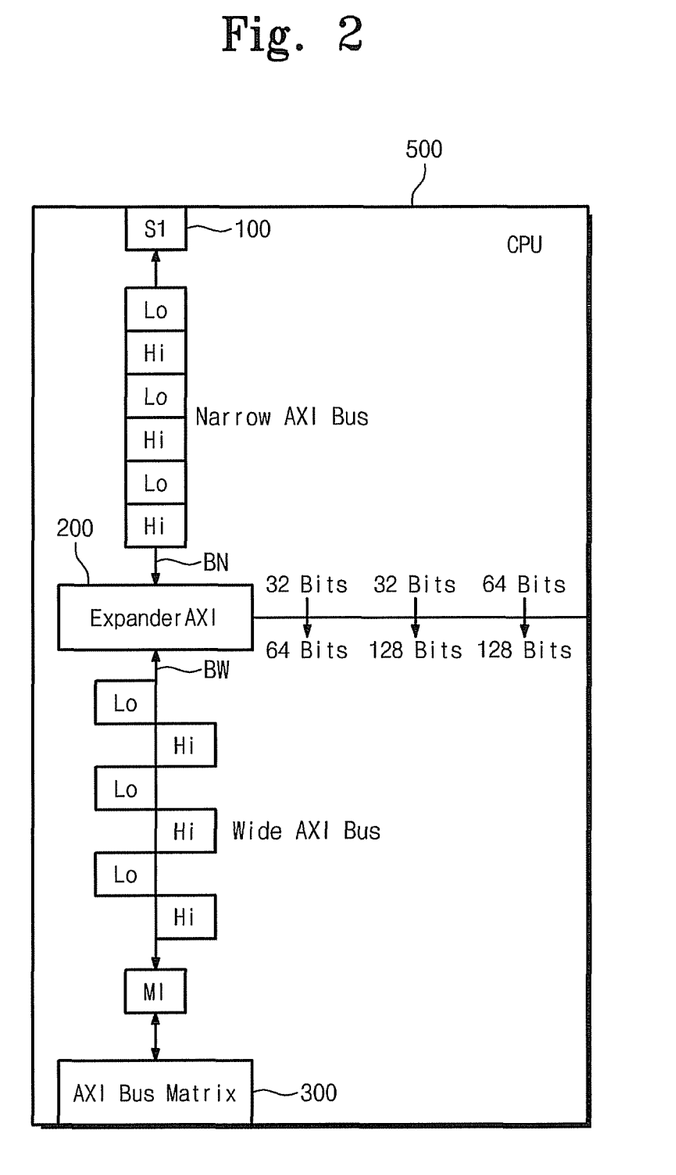
FIG. 2 is a block diagram illustrating a data processing system having a bus structure connected to an upsizer of FIG. 1.

FIG. 2 is a block diagram illustrating a data processing system having a bus structure connected to an upsizer (or expander) of FIG. 1.

Referring to FIG. 2, a data processing system 500 may include a narrow AXI bus on one side (for example, over) of the upsizer 200 and a wide AXI bus on another side (for example, under) of the upsizer 200. The upsizer 200 may expand 32-bit, 32-bit, and 64-bit data applied to a narrow bus line BN to 64-bit, 128-bit, and 128-bit data, respectively, to provide the expanded data to a wide bus line BW.

Figure 3:
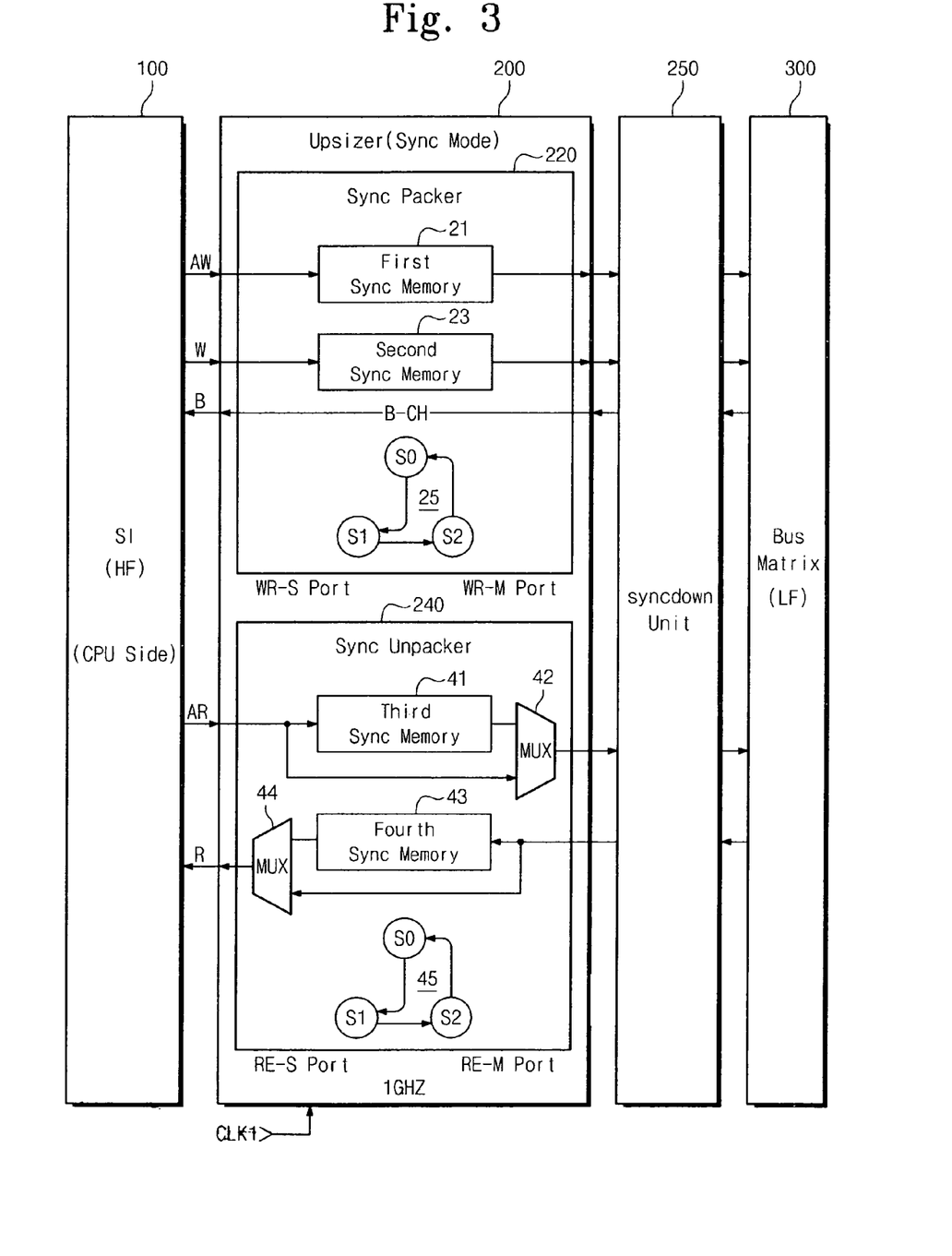
FIG. 3 is a block diagram illustrating a bandwidth synchronization circuit according to example embodiments of the inventive concepts.
Figure 4:
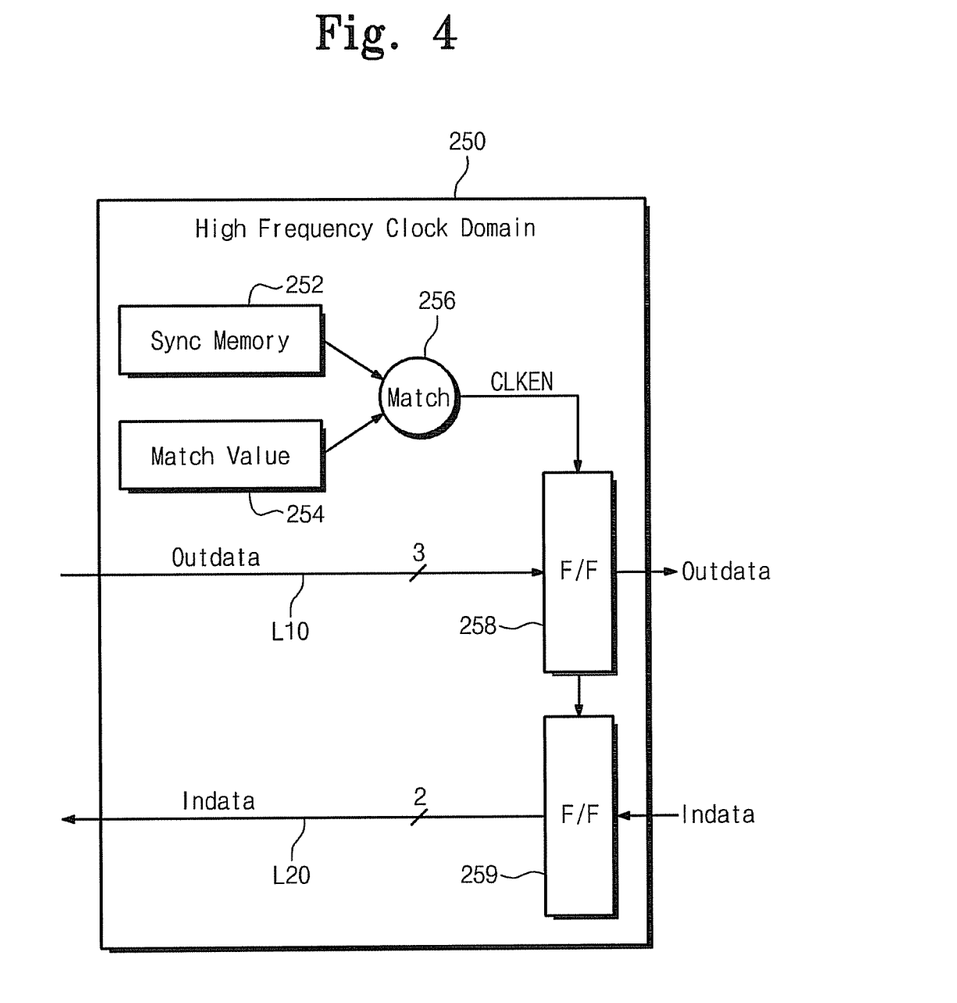
FIG. 4 is a block diagram illustrating a syncdown unit of FIG. 3.

FIG. 3 is a block diagram illustrating a bandwidth synchronization circuit according to example embodiments of the inventive concepts. FIG. 4 is a block diagram illustrating a syncdown unit of FIG. 3.

Hereinafter, the example embodiments will be described with reference to FIGS. 3 and 4.

In FIG. 3, an upsizer 200 and a syncdown unit 250 may form a bandwidth synchronization circuit.

The upsizer 200 may include a sync packer 220 and a sync unpacker 240 that operate based on a processor clock CLK1. The sync packer 220 may include first and second sync memories 21 and 23 and a sync packing controller 25. The sync unpacker 240 may include third and fourth sync memories 41 and 43, first and second selectors 42 and 44, and a sync unpacking controller 45. The sync packer 220 may perform sync packing on a write address channel, a write data channel, and a write response channel. The sync unpacker 240 may perform sync unpacking on a read address channel and a read data channel.

The first sync memory 21 may store an address of the write address (AW) channel in response to a control from the sync packing controller 25, and may upsize the stored address to output the upsized address to the syncdown unit 250.

The second sync memory 23 may store data of the write data channel (W) in response to a control from the sync packing controller 25, and may upsize the stored data to output the upsized data to the syncdown unit 250. For example, stored 64-bit data may be applied to the syncdown unit 250 as 128-bit data by the upsizing.

The third sync memory 41 may store an address of the read address channel (AR) in response to a control from the sync unpacking controller 45, and may upsize the stored address to output the upsized address to the syncdown unit 250 through the selector 42.

The fourth sync memory 43 may store data of the read data channel (R) in response to a control from the sync unpacking controller 45, and may output the stored data to the slave interface 100 via the selector 44. For example, 128-bit data may be provided to the slave interface 100 as 64-bit data.

The first to fourth sync memories 21, 23, 41 and 43 may be implemented, for example, using First-In First-Out (FIFO) memories having a first-in first-out function.

The syncdown unit 250 may be connected to the upsizer 200, and may perform a syncdown on the output of the upsizer 200 in response to a bus clock of lower frequency than that of the processor clock.

In FIG. 3, a clock CLK1 applied to the upsizer 200 may also be operated under the clock domain of the processor. Accordingly, when the processor clock has a frequency of about 1 GHz, the clock CLK1 may also have a frequency of about 1 GHz. On the other hand, the bus clock may have a frequency of about 200 MHz.

The processor (or CPU) clock may be a Dynamic Voltage Frequency Scaling (DVFS) clock controlled by a Dynamic Voltage Frequency Scaling Controller (DVFSC) that may minimize the current consumption of a SoC. The clock frequency may be dynamically controlled by the DVFSC.

FIG. 4 is a block diagram illustrating a syncdown unit 250 of FIG. 3. Referring to FIG. 4, the syncdown unit 250 may include a sync memory 252, a match value 254, a match 256, first and second flip-flops 258 and 259. The sync memory 252 may store data. The match value 254 may store desired match values. The match 256 may determine whether the data stored in the sync memory 252 matches the match value. The match 256 may be implemented using a comparator, for example. The first and second flip-flops 258 and 259 may a latch data in response to an activation signal CLKEN of the match 256. In FIG. 4, an output line L10 collectively represents AW, W and AR of FIG. 3, and an input line L20 collectively represents B and R of FIG. 3.

According to example embodiments the upsizer may operate at a high frequency of about 1 GHz, and a high frequency pipeline structure may be used.

Hereinafter, example embodiments of the inventive concepts will be described with reference to FIGS. 5 and 6.

Figure 5:
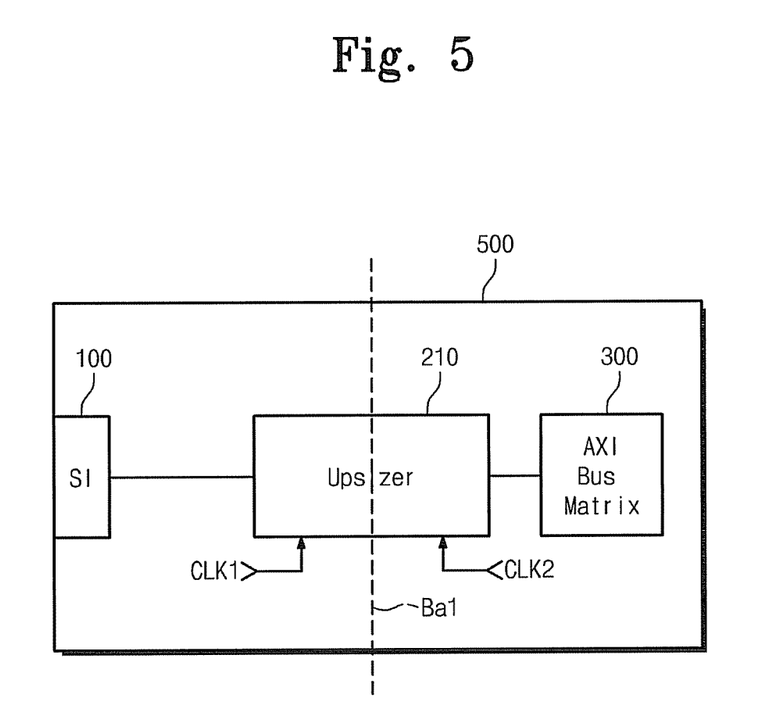
FIG. 5 is a detailed block diagram illustrating a bandwidth synchronization circuit according to example embodiments of the inventive concepts.

FIG. 5 is a block diagram illustrating a bandwidth synchronization circuit according to the example embodiments of the inventive concepts. FIG. 6 is a detailed block diagram illustrating an upsizer of FIG. 5.

Referring to FIG. 5, the bandwidth synchronization circuit 500 may include the block structure of the upsizer 210 performing an upsizing function in response to the first clock CLK1 and the second clock CLK2 around a dashed line bar Ba1. Although not shown, upsizer 210 may be connected to a syncdown unit according to example embodiments disclosed above.

The upsizer 210 may be installed between the processor side 100 and the bus matrix 300. In FIG. 6, the upsizer 210 may include first and second sync packers 222 and 224 operated in response to first and second clocks CLK1 and CLK2, respectively, and first and second sync unpackers 242 and 244 operated in response to the first and second clocks CLK1 and CLK2, respectively. The first and second sync packers 222 and 224 may share first and second sync memories 21 and 23. The first sync packer 222 may include a first sync packing controller 26, and the second sync packer 224 may include a second sync packing controller 27. The first and second sync unpackers 242 and 244 may share third and fourth sync memories 41 and 43. The first sync unpacker 242 may include a second multiplexer 44 and a first sync unpacking controller 46, and the second sync unpacker 244 may include a first multiplexer 42 and a second sync unpacking controller 47. The reference characters FSM_s and FSM_m shown besides the first and second sync packing controllers 26 and 27 and the first and second sync unpacking controllers 46 and 47 represent finite state machine-slave and finite state machine-master, respectively.

When the first clock CLK1 is about 400 MHz, the second clock CLK2 may be about 200 MHz. Accordingly, the first clock CLK1 may be provided from the CPU side, and the second clock CLK2 may be provided from the BUS side.

Figure 6:
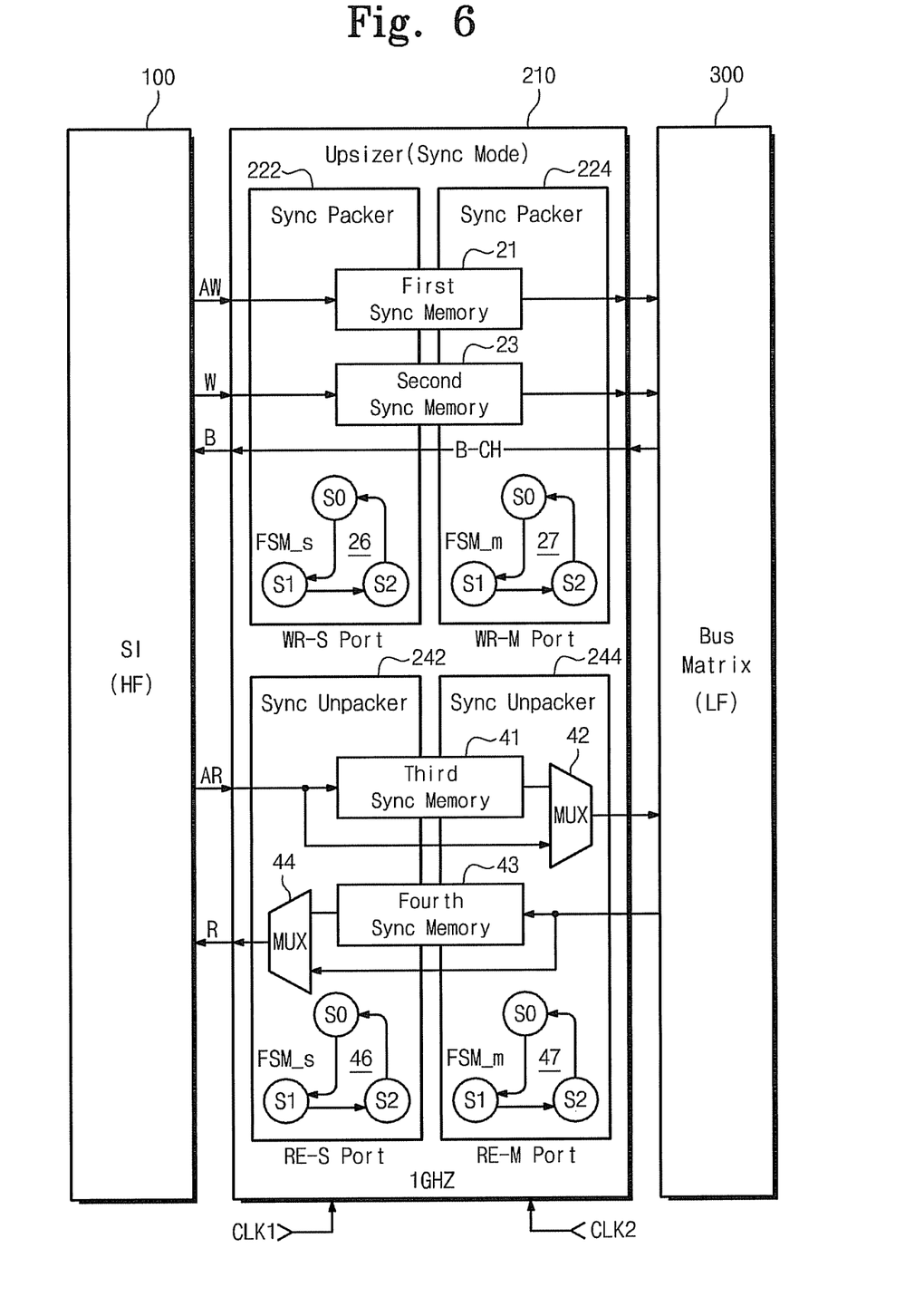
FIG. 6 is a block diagram illustrating an upsizer of FIG. 5.

The upsizer 210 shown in FIG. 6 may be somewhat similar to the upsizer 200 of FIG. 3, except that the upsizer 210 is divided into two parts that may operate at different frequencies.

Thus, in the case of different bit widths of 64-bit and 128-bit, if the first sync packer 222 and the first sync unpacker 242 in the upsizer 210 operate at 400 MHz, and the second sync packer 224 and the second sync unpacker 244 operate at 200 MHz, a bandwidth balance may be achieved.

However, example embodiments of FIG. 6 may use a 400 MHz clock in addition to a 200 MHz bus clock and 1 GHz DVFS clock. Accordingly, example embodiments of FIG. 6 are particularly useful in a case of loading due to presence of additional clocks.

Figure 7:
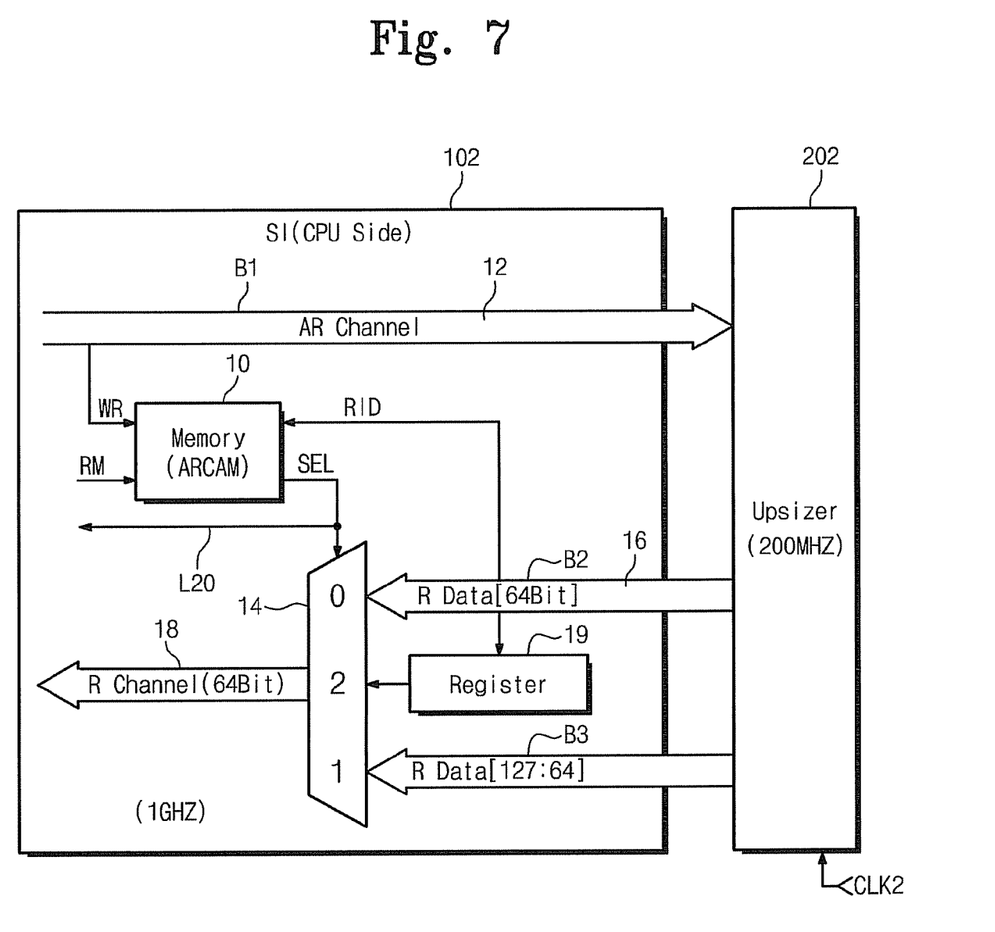
FIG. 7 is a block diagram illustrating a bandwidth synchronization circuit according to example embodiments of the inventive concepts.
Figure 8:
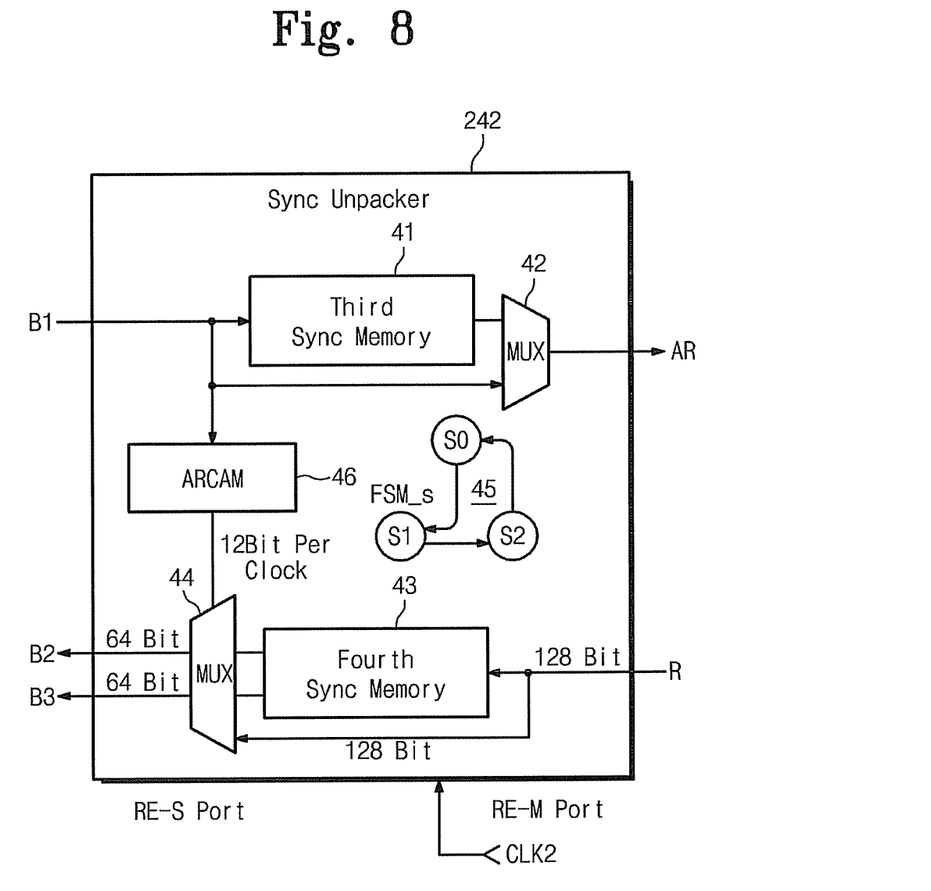
FIG. 8 is a block diagram illustrating a part of an upsizer of FIG. 7.
Figure 9:
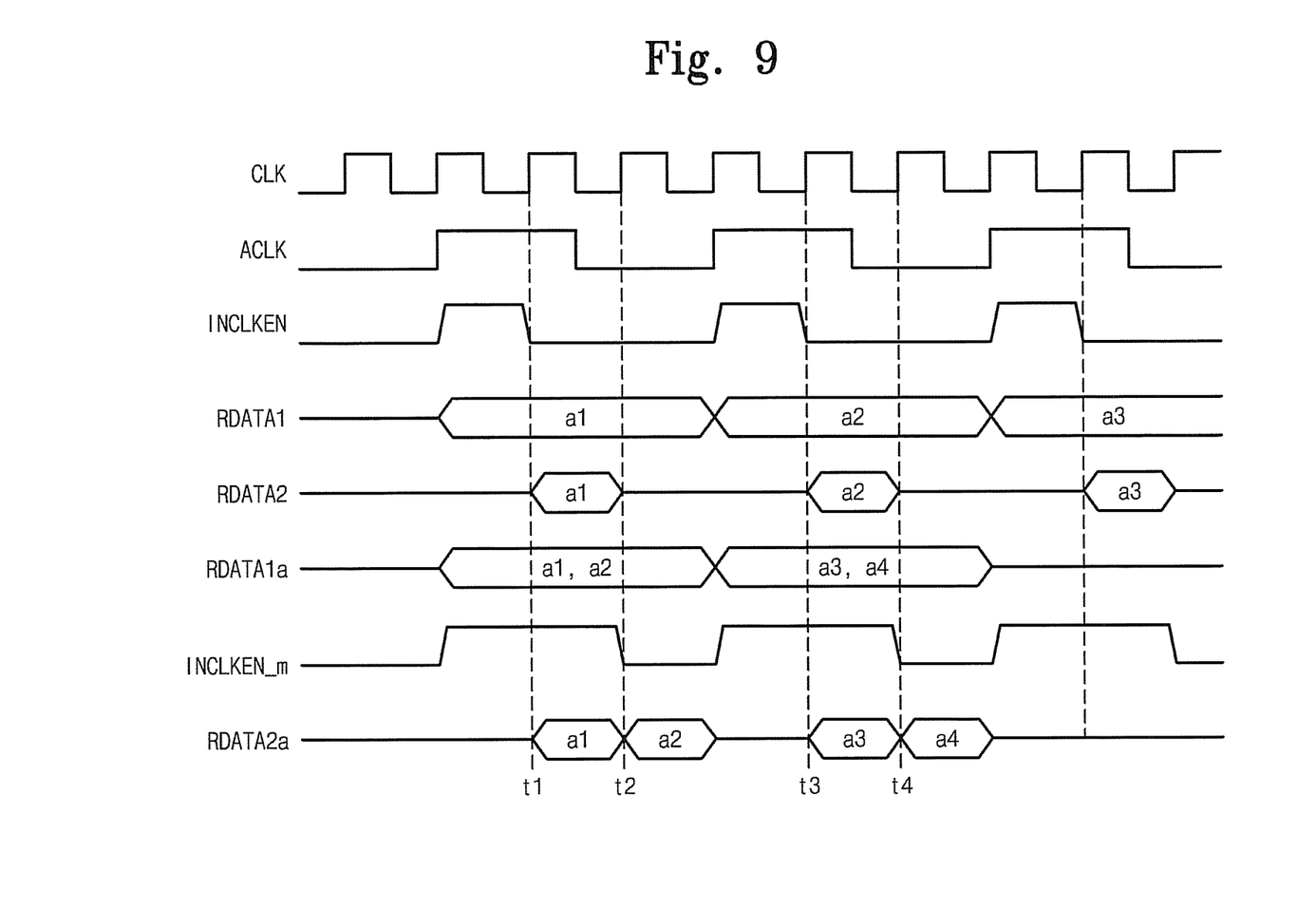
FIG. 9 is an operation timing diagram of the circuit of FIG. 7.

FIG. 7 is a block diagram illustrating a bandwidth synchronization circuit according to example embodiments of the inventive concepts. FIG. 8 is a block diagram illustrating a part of an upsizer of FIG. 7. FIG. 9 is an operation timing diagram of the circuit of FIG. 7.

Referring to FIG. 7, the bandwidth synchronization circuit may include an upsizer 202 operating at a second clock CLK2 and a slave interface (SI) 102 of a CPU side. The SI 102 may have a configuration of a request selection supplying unit including a memory 10, a multiplexer 14, and a register 19. According to example embodiments of the inventive concepts, the bandwidth synchronization circuit may include the upsizer 102 and the request selection supplying unit. Although not shown, upsizer 202 may be connected to a syncdown unit according to example embodiments disclosed above.

The upsizer 202 may operate in response to a second clock CLK2 (e.g., 200 MHz), and may include a sync unpacker (242 of FIG. 8) outputting read data R having a second data bit width in response to a predetermined/desired request (e.g., wrap 4 burst read request, or wrap 8 burst read request). According to example embodiments the upsizer 202 may also include sync packer(s) according to any of the example embodiments disclosed above.

The request selection supplying unit may bypass/block the read data R of a first data width that is input in response to a general command request (increment burst or fixed burst). With the wrap 4 burst read request, for example, the request selection supplying unit may supply the read data R input having a second data bit width (e.g., 128-bit), for two clock cycles in response to the first clock (e.g., 1 GHz) having a higher frequency than the second clock.

The memory 10 is a circuit element that detects the presence or absence of the wrap 4 burst read request. The memory 10 may include Address Read Contents Addressable Memory (ARCAM). The multiplexer 14 may receive a 128-bit data via bus lines B2 and B3 and, in response to a selection signal SEL, and may supply the received 128-bit data to the R-channel 18 in synchronization with the first clock (e.g., 1 GHz). For example, the received 128 bit data may be supplied in two portions each having 64 bits of data. When the selection signal SEL is inactivated (for example, in a case of a general request), the multiplexer 14 may not provide the 64-bit data that is provided by the bus line B2 to the R-channel 18. Instead, the register 19 may store the 64-bit data and may function as a storage element for reorder. For example, the register 19 may be used to output data in sequence when the data are not input in sequence during the wrap 4 burst read request.

Referring to FIG. 8, the sync unpacker 242 may include third and fourth sync memories 41 and 43, first and second multiplexers 42 and 44, a memory 46, and a sync unpacking controller 45. The memory 46 may detect the presence or absence of a wrap 4 burst read request. When performing sync unpacking on the read address channel AR and the read data channel R, the sync unpacker 242 may output read data R having a second bit width (for example, 128-bit) via the bus lines B2 and B3 with respect to a desired request (e.g., wrap 4 burst read request). Also, in cases of a request other than the wrap burst read request, 64-bit data output from the fourth sync memory 43 may be outputted in synchronization with the second clock (e.g., 200 MHz). In case of the wrap 4 burst read request, 128-bit data may be output from the fourth sync memory 43, or 128-bit data bypassing the fourth sync memory 43 may be outputted.

FIG. 9 shows that, referring to RDATA2a, read data is output having the second data bit width (for example, 64 bits) with respect to the wrap 4 burst read request. The RDATA2a shows a timing of data output from the multiplexer 14 of FIG. 7. CLK shown in FIG. 9 represents a clock of a CPU. The clock of the CPU may correspond to the first clock having a frequency of about 1 GHz. Also, the ACLK represents an AXI bus clock, which corresponds to the second clock having a frequency of about 200 MHz. INCLKEN represents an input clock enable signal.

In FIG. 9, a section between time points t1 and t2 may correspond to one clock cycle of the CPU.

Also, a section between time points t3 and t4 may correspond to one clock cycle of the CPU. Referring to RDATA1a, 128-bit data may be received during one cycle of the bus clock (200 MHz) in response to the wrap 4 burst read request. The received 128-bit RDATA1a may be output as 128-bit data (data obtained by adding a1 and a2) during 2 clock cycles of the CPU in response to an enable signal INCLKEN_M modified from the input clock enable signal INCLKEN.

On the other hand, RDATA1 shows that 64-bit data is received in the absence of the wrap 4 burst read request. RDATA2 shows that the received 64-bit data is output as 64-bit data a1 during one clock cycle of the CPU.

Accordingly, a data having a bit width twice the bit width size of the R-channel may be transmitted during the second clock and in response to a specific request, for example, the wrap 4 burst read request. This data may then be supplied during 2 cycles of the first clock. As a result, the balance of the bandwidth may be efficiently maintained.

Figure 10:
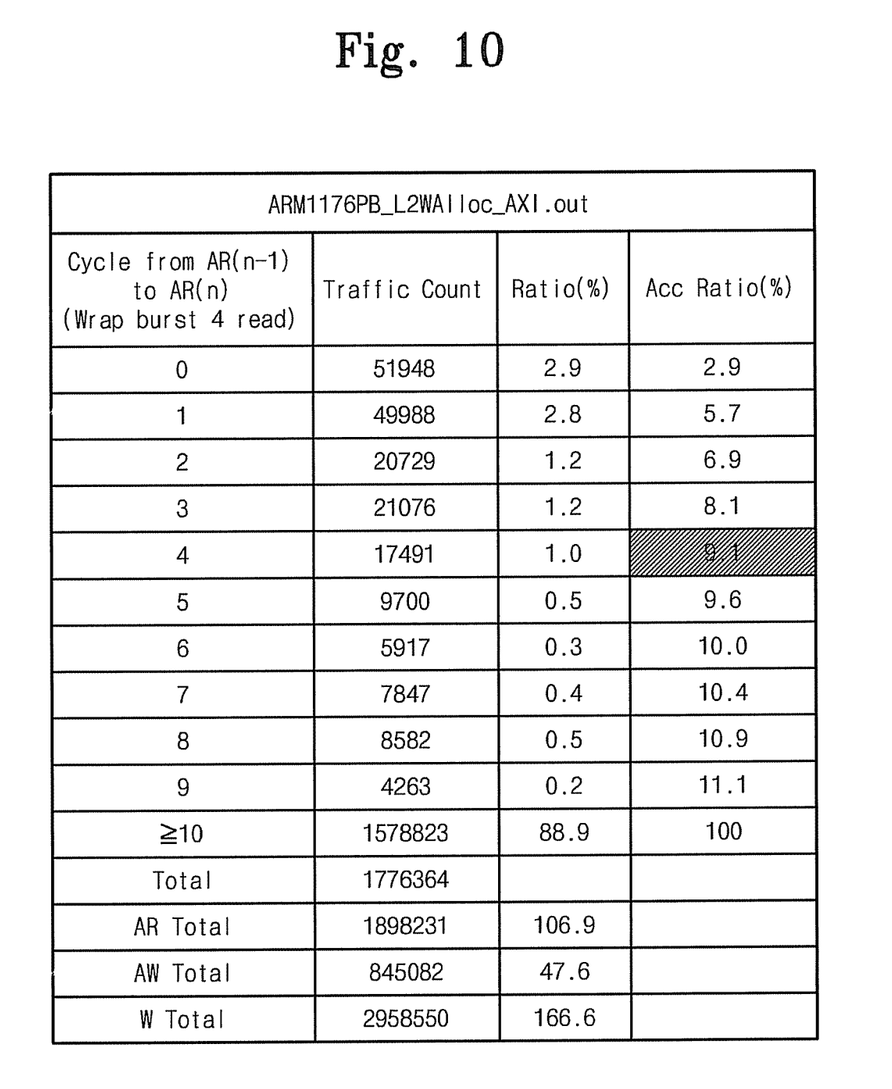
FIGS. 10 and 11 are tables showing the frequency of heavy requests during an operation of a processor.
Figure 11:
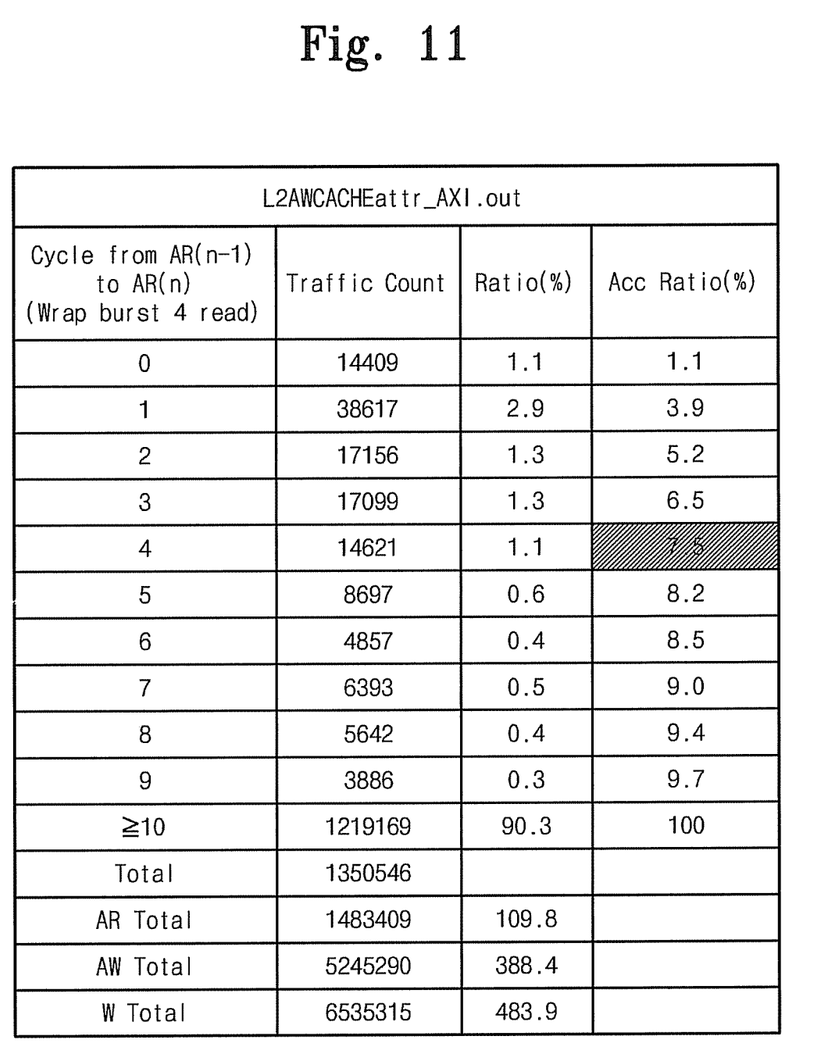

One function of the wrap 4 burst read request in the example embodiments is illustrated in FIGS. 10 and 11.

FIGS. 10 and 11 are tables showing the frequency of heavy requests during an operation of a processor.

When heavy (for example, resource intensive) requests such as multiple loads or command execution occur, cache miss cases may be incurred, thereby reducing system operation performance. According to example embodiments of the inventive concepts, a CPU trace analysis has been performed on two cases to find the frequency of the cache miss case.

FIG. 10 is a table showing the frequency of the heavy requests in case of ARM1176PB_L2WAllocAXI.out using an AXI bus from Advanced RISC Machine (ARM) Inc. FIG. 11 is a table showing the frequency of the heavy requests in case of ARM1176PB_L2AWCACHEattr_AXI.out. Here, L2WAlloc represents allocation of L2 cache, and L2AWCACHEattr may represent attribution of a write address of the L2 cache.

In FIG. 10, a traffic count occurring within four clock cycles may be 17,491 in an AR wrap burst 4 request, which indicates an accumulation ratio of about 9.1%. In FIG. 11, the traffic count occurring within four clock cycles may be 14,621 in the AR wrap burst 4 request, which indicates an accumulation ratio of about 7.5%. Eventually, the frequency of the heavy requests may be about 5.88% in all in FIG. 10, and the frequency of the heavy requests may be about 1.51% in all in FIG. 11.

As described above, with respect to the wrap 4 burst read request of critical performance in order to solve the bandwidth bottleneck data may be sent at a timing of RDATA1a of FIG. 9 and may be supplied to the CPU side at a timing of RDATA2a, resulting in more efficient solution to the bandwidth bottleneck.

Figure 12:
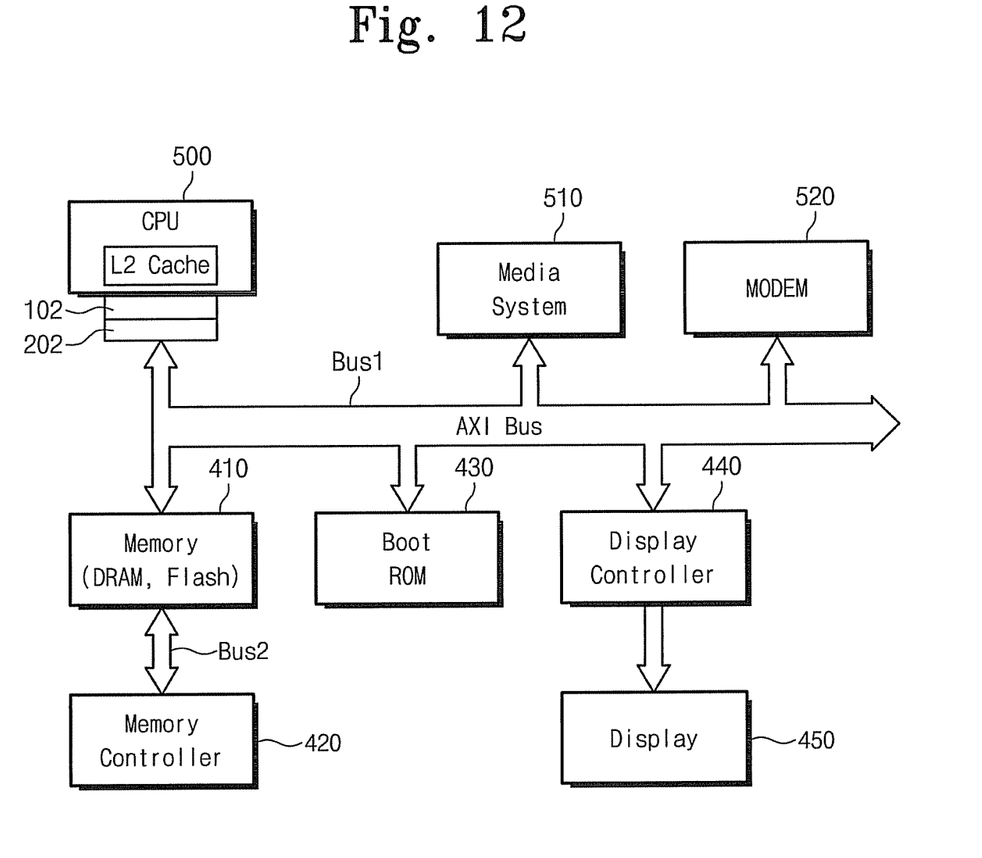
FIG. 12 is a block diagram illustrating a mobile system employing a bandwidth synchronization circuit according to example embodiments of the inventive concepts.

FIG. 12 is a block diagram illustrating a mobile system including a bandwidth synchronization circuit according to example embodiments of the inventive concepts.

Referring to FIG. 12, the mobile system may include a CPU 500 having an L2 cache, a media system 510 connected to an AXI bus BUS1, a modem 520, a memory controller 420, a boot ROM 430, and a display controller 440. A memory 410, for example, DRAMs, flash memory or the like, may be connected to the memory controller 420. A display 450, for example, a LCD or the like, may be connected to the display controller 440.

BUS1 may be a CPU bus, and BUS2 may be a memory bus. The CPU 500 may include a level one (L1) cache in addition to a level 2 (L2) cache. The L1 cache may be used to store data and/or commands frequently accessed. Similarly, the L2 cache may be used to store data and/or commands frequently accessed.

The mobile system of FIG. 12 may be implemented in, for example, smart phones, personal navigation devices, portable Internet devices, portable broadcasting devices, and/or multimedia devices.

In the mobile system of FIG. 12, the bandwidth synchronization circuit according to example embodiment illustrated in FIG. 7 may be mounted between the block of the CPU 500 and the AXI bus. However, example embodiments are not limited thereto and any of the preceding example embodiments may be used in the mobile system.

In this case, since the SI block 102 of FIG. 7 is at the CPU side, the SI block 102 may be driven at a first clock of about 1 GHz, and the upsizer 202 connected to the AXI bus may be driven at a second clock of about 200 MHz.

In a normal read, 64-bit read data may be output in synchronization with the 200 MHz clock at the upsizer 202 side, and, in a 64-bit wrap 4 burst read, 128-bit read data may be output in synchronization with the 200 MHz clock.

In the normal read, the SI block 102 of the CPU side may bypass the 64-bit read data to the CPU through the R-channel 18, and in the wrap 4 burst read, may supply the 128-bit read data to the CPU during two cycles in synchronization with the 1 GHz clock.

Thus, when bandwidth synchronization is performed in case of the wrap 4 burst read request, modification of the upsizer circuit can be minimized, and also the bandwidth bottleneck can be efficiently solved, thereby improving the operation performance of the mobile system employing the SoC. In addition, the manufacturing cost of the data processing system such as the mobile system can also be reduced.

Although example embodiments of the inventive concepts are described with respect to the bandwidth bottleneck generated between 64-bit high frequency CPU subsystem and 128-bit low frequency bus interface, example embodiments are not limited thereto and the example embodiments of the inventive concepts may also be applied to any data processing system in which bandwidth bottlenecks may occur.

According to example embodiments, the number of the processors may be increased to greater than two in the mobile system. Examples of the processors may include microprocessors, CPUs, digital signal processors, microcontrollers, reduced command set computers, complex command set computers or the like.

According to example embodiments of the inventive concepts, synchronization bottleneck between a CPU and a bus can be minimized or reduced.

Therefore, when a bandwidth synchronization circuit is used in a SoC, manufacturing cost of a data processing system can be reduced, and operation performance of the SoC can be improved.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A bandwidth synchronization circuit comprising:
   an upsizer including at least one sync packer and at least one sync unpacker, the at least one sync packer and the at least one sync unpacker operating based on a first clock; and
   a syncdown adjuster coupled to the upsizer and configured to perform a syncdown operation on data of the upsizer in response to a second clock having a frequency lower than a frequency of a processor clock, wherein the at least one sync packer performs sync packing on a write address channel, a write data channel, and a write response channel, and the at least one sync unpacker performs sync unpacking on a read address channel and a read data channel.

2. The bandwidth synchronization circuit of claim 1, wherein the first clock is a clock of the processor having a frequency of about 1 GHz and the second clock is a bus clock having a frequency of about 200 MHz.

3. The bandwidth synchronization circuit of claim 1, wherein the at least one sync packer includes:
   a first sync memory and a second sync memory, the first and second sync memories configured to receive at least one of the write address channel, the write data channel, or the write response channel, and
   wherein the at least one sync unpacker includes:
   a third sync memory and a fourth sync memory, the third and fourth sync memories configured to receive at least one of the read address channel or the read data channel.

4. The bandwidth synchronization circuit of claim 3, wherein the first sync memory stores an address of the write address channel in response to a control from a sync packing controller, and upsizes the stored address to output the upsized address to the syncdown adjuster.

5. The bandwidth synchronization circuit of claim 3, wherein the second sync memory stores data of the write data channel in response to a control from a sync packing controller, and upsizes the stored data to output the upsized data to the syncdown adjuster.

6. The bandwidth synchronization circuit of claim 3, wherein the third sync memory stores an address of the read address channel in response to a control from a sync unpacking controller, and upsizes the stored address to output the upsized address to the syncdown adjuster through a selector.

7. The bandwidth synchronization circuit of claim 3, wherein the fourth sync memory stores data of the read data channel in response to a control of a sync unpacking controller, and outputs the stored data to a slave interface via a selector.

8. The bandwidth synchronization circuit of claim 3, at least one of the first, second, third or fourth sync memory is a First-In First-Out (FIFO) memory.

9. A bandwidth synchronization circuit, comprising:
   an upsizer including at least one sync packer and at least one sync unpacker, the at least one sync packer and the at least one sync unpacker operating based on a first clock; and
   a syncdown adjuster coupled to the upsizer and configured to perform a syncdown operation on data of the upsizer in response to a second clock having a frequency lower than a frequency of a processor clock, wherein the syncdown adjuster comprises:
   a sync memory configured to store data;
   a match value configured to store at least one match value;
   a match configured to determine whether the data stored in the sync memory matches the at least one match value; and
   a first and a second flip-flop configured to latch data in response to an activation signal generated from the match.

10. A bandwidth synchronization circuit, comprising:
    an upsizer including at least one sync packer and at least one sync unpacker, the at least one sync packer and the at least one sync unpacker operating based on a first clock; and
    a syncdown adjuster coupled to the upsizer and configured to perform a syncdown operation on data of the upsizer in response to a second clock having a frequency lower than a frequency of a processor clock, wherein the upsizer includes:
    a first sync packer and a second sync packer respectively operating in response to the first clock and the second clock; and
    a first sync unpacker and a second sync unpacker respectively operating in response to the first and second clocks, the first clock and the second clock having different frequencies.

11. The bandwidth synchronization circuit of claim 10, wherein the frequency of the first clock is about 400 MHz and the frequency of the second clock is about 200 MHz.

12. The bandwidth synchronization circuit of claim 10, wherein the first clock is supplied from a processor side and the second clock is supplied from a bus side.

13. The bandwidth synchronization circuit of claim 10, wherein the first and second sync packers share a first sync memory and a second sync memory, the first and second sync memories configured to receive at least one of a write address channel, a write data channel, or a write response channel; and
    wherein the first and second sync unpacker share a third sync memory and a fourth sync memory, the third and fourth sync memories configured to receive at least one of a read address channel or a read data channel.

14. The bandwidth synchronization circuit of claim 13, wherein the first sync memory stores an address of the write address channel in response to a control from a sync packing controller.

15. The bandwidth synchronization circuit of claim 13, wherein the second sync memory stores data of the write data channel in response to a control from a sync packing controller.

16. The bandwidth synchronization circuit of claim 13, wherein the third sync memory stores an address of the read address channel in response to a control from a sync unpacking controller.

17. The bandwidth synchronization circuit of claim 13, wherein the fourth sync memory stores an address of the read data channel in response to a control from a sync unpacking controller.

18. A bandwidth synchronization circuit, comprising:
an upsizer including at least one sync packer and at least one sync unpacker, the at least one sync packer and the at least one sync unpacker operating based on a first clock; and
a syncdown adjuster coupled to the upsizer and configured to perform a syncdown operation on data of the upsizer in response to a second clock having a frequency lower than a frequency of a processor clock, wherein:
the at least one sync unpacker outputs data having a first data width in response to a desired request and the second clock, the first data width being greater than a second data width; and
the bandwidth synchronization circuit further includes a request selection supplying unit configured to block at least a portion of the data, the blocked portion having a width of the second data width, in response to a general request, and the request selection supplying unit configured to supply the data having the first data width in response to the desired request and the first clock, a frequency of the first clock being greater than a frequency of the second clock.

19. The bandwidth synchronization circuit of claim 18, wherein the request selection supplying unit is at a central processing unit (CPU) side of the circuit.

20. The bandwidth synchronization circuit of claim 18, wherein the desired request is a wrap 4 burst read request.

21. The bandwidth synchronization circuit of claim 18, wherein the first data width is 128-bits and the second data width is 64-bits.

22. The bandwidth synchronization circuit of claim 18, wherein the data output by the sync unpacker is a read data having a width greater than the second data width.

23. A data processing system comprising:
a processor coupled to a cache controller;
the bandwidth synchronization circuit of claim 18 coupled between the processor and an interface bus; and
a plurality of peripheral functional blocks coupled to the interface bus.

24. The data processing system of claim 23, wherein the peripheral functional block include at least two of Direct Memory Access Controller (DMAC), Universal Serial Bus (USB), Peripheral Component Interconnection (PCI), Static Memory Controller (SMC), or Smart Card Interface (SCI).

25. The data processing system of claim 23, wherein the interface bus is an Advanced eXtensible Interface (AXI) bus.

26. The data processing system of claim 23, wherein, in a 64-bit wrap 4 burst read, the upsizer supplies one 128-bit read data at every cycle of the second clock having a frequency of about 200 MHz.

27. A bandwidth synchronization method comprising:
driving a processor at a first clock frequency and an upsizer connected to an interface bus with a second clock frequency;
outputting, to the upsizer, a read data having with a first data width in synchronization with the second clock frequency with respect to a first read command, and outputting a read data with a second data width in synchronization with the second clock frequency with respect to a second read command;
blocking, in the upsizer, the read data when the read data with the first data width is input; and
supplying the read data in synchronization with the first clock frequency for two cycles of the first clock when the read data with the second data width is input.

28. The method of claim 27, wherein the first data bit width is 64-bit, the second data bit width is 128-bit.

29. The method of claim 27, wherein the first clock frequency is about 1 GHz and the second clock frequency is about 200 MHz.

* * * * *